Feb. 7, 1961  R. T. SCHULTZ  2,971,102
TRANSISTOR CIRCUIT
Filed July 21, 1959  2 Sheets-Sheet 1

Robert T. Schultz,
INVENTOR.

BY.

Billy a. Robbins

ATTORNEY

Feb. 7, 1961    R. T. SCHULTZ    2,971,102
TRANSISTOR CIRCUIT
Filed July 21, 1959    2 Sheets-Sheet 2
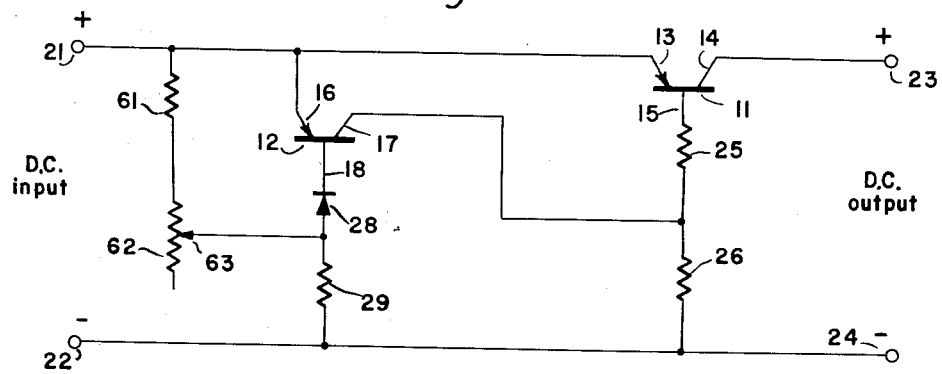
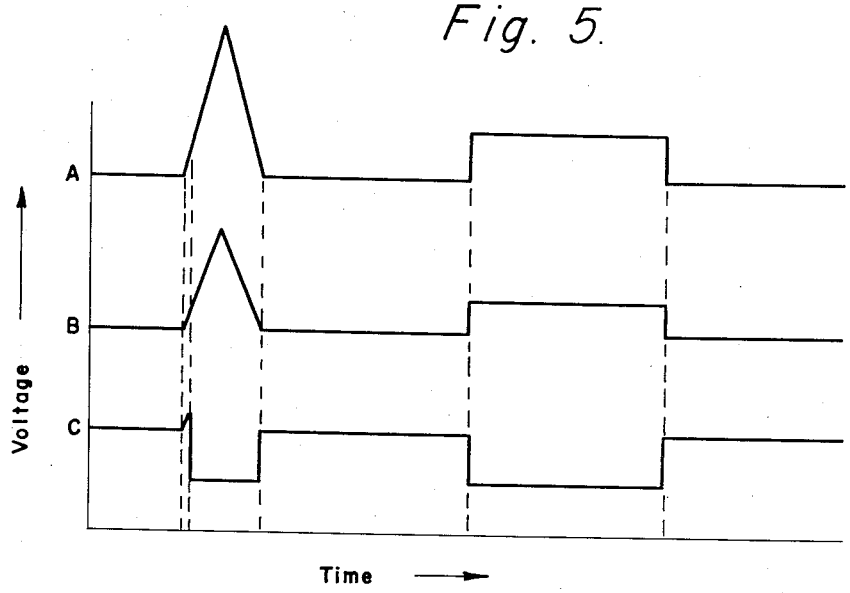
Robert T. Schultz,
INVENTOR.
BY.
Billy A. Robbins
ATTORNEY.

United States Patent Office 2,971,102
Patented Feb. 7, 1961

2,971,102
TRANSISTOR CIRCUIT
Robert T. Schultz, 1250 N. Tressy Ave., Glendora, Calif.
Filed July 21, 1959, Ser. No. 828,491
12 Claims. (Cl. 307—93)

This invention relates to transistor circuits and more particularly to a circuit for eliminating transients from a direct current power supply prior to the application thereof to a using apparatus.

It has long been known in the prior art that it is desirable to eliminate transients from a power supply prior to the application of the voltage and the current from the power supply to a using apparatus. If the transients are not eilminated from the power supply output prior to the application thereof, to the using apparatus, there is a possibility of damaging the components in the apparatus. In many instances, if the transient is of sufficient magnitude or duration the components will be damaged to the extent of rendering them completely useless. In addition to the foregoing, the transients, if allowed to enter the using apparatus, may in some instances cause a false operation of the circuit or a false indication such as an unwanted or spurious output thereof.

As a result of the undersirable consequences of transients, many attempts have been made in the prior art to eliminate them from power supplies. One such attempt was the utilization of relay circuits which operated in response to the transient in order to disconnect the power supply from the using apparatus prior to the time damage could be done by the transient. While such relay circuits operate quite effectively under some circumstances, it is well known that relay circuits operate quite slowly, electronically speaking. In addition to the slow operation, the relay contacts wear, either due to friction from the mechanical contact between them or due to the arcing which occurs across the contacts. Also, if a relay is utilized in such a manner and transients are frequent, relatively noisy operation results.

A second attempt in the prior art to overcome the undesirable consequences of transients was the use of circuits utilizing capacitors to eliminate the transients. In such circuits the charging of the capacitors was utilized to operate upon electronic circuits in order to remove the transient from the using apparatus. Once again the charging of capacitors, although faster in operation than relay circuits, is still somewhat slow compared to the speed with which many electronic circuits must operate in the present art.

There have been some electronic circuits which have been placed in use to eliminate transients and to overcome the disadvantages of the prior art circuits used for this purpose. While these electronic circuits have been useful up to a certain point, certain disadvantages are inherent in them. The circuits presently known to the art cannot withstand long duration transients. If a transient of a long duration is applied to the presently known circuits in the art, the large amount of current which flows through them will cause destruction of the components.

With the present electronic circuits utilized to eliminate transients, some difficulties arise when these circuits are utilized in conjunction with such apparatus as a transistor D.C. to D.C. converter circuit. As is well known in the art, the D.C. to D.C. converter circuit is quite difficult to start, that is, to initiate oscillations. Since this is the case, many circuits which may be desirable for utilization with the D.C. to D.C. converters cannot be used since it complicates the starting problems.

Accordingly, it is an object of the present invention to provide a transistor circuit which automatically eliminates undesirable transients present in the output of a direct current power supply.

It is another object of the present invention to provide a transistor circuit which automatically eliminates undesirable transients and which is capable of operating continuously over long periods of time.

It is another object of the present invention to provide a transistor circuit which eliminates undesirable transients and which is substantially instantaneous in operation.

It is a further object of the present invention to provide a transistor circuit for eliminating undesirable transients which can be used with all types of equipment and which will not create starting problems when utilized in conjunction with a direct-current to direct-current converter.

According to one aspect of the present invention, a transistor circuit is provided that may be utilized at the output of a power supply and before the input to the using apparatus. This transistor circuit is utilized in such a manner that during normal operation, that is, when no transients are present in the output of the power supply, the transient eliminating portion of the circuit is inactive and is, therefore effectively removed from the circuit, thereby eliminating any inefficiency of operation which might otherwise be present. Upon the application of a transient to the transistor circuit, the transient eliminating portion of the circuit comes into operation and removes the power from the using apparatus, thus completely eliminating the possibility of the transient entering the using apparatus. Upon the removal of the transient, the circuit automatically returns to its normal operating condition.

In accordance with a specific configuration of the present invention, a pair of transistors is utilized. One of these transistors is biased in such a manner as to pass current from the power supply to the using apparatus during the absence of transients. Means is connected to the second transistor for maintaining it in a substantially non-conducting state during the absence of transients and for causing it to become conducting when transients are present in the output of the power supply. The two transistors are interconnected in such a manner that when the second transistor is operating it automatically causes the first transistor to become non-conducting, thereby removing the power from the using apparatus.

Additional objects of the present invention will become apparent from a consideration of the following description taken in conjunction with the accompanying drawing which is presented by way of example only and is not intended as a limitation upon the scope of the present invention as defined in the appended claims and in which:

Fig. 4 is a schematic circuit diagram illustrating a way of obtaining fine control of a circuit in accordance with the present invention; and Fig. 5 is a schematic representation of voltage wave forms taken at various points throughout the circuit as illustrated in Fig. 1.

Figure 1:
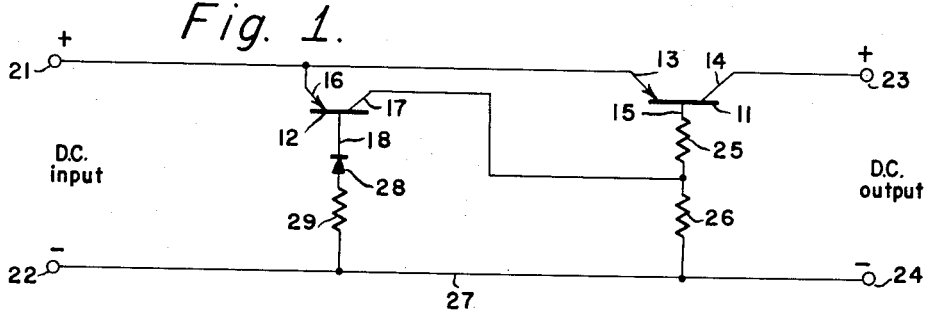
Fig. 1 is a schematic diagram of one embodiment of a transistor circuit in accordance with the present invention.

Referring now to the drawing, and more particularly to Fig. 1, there is illustrated a circuit in accordance with the present invention. There is therein illustrated transistors 11 and 12, each of which is a P–N–P transistor as shown by the accepted schematic symbol. N–P–N transistors could be used by reversing the polarities of the applied potentials as hereinafter described. Transistor 11 includes an emitter 13, a collector 14 and a base 15. Transistor 12 includes an emitter 16, a collector 17 and a base 18. Emitters 13 and 16 are interconnected and returned to terminal 21 which is the positive terminal of a power supply output of which terminal 22 is the negative terminal. Collector 14 of transistor 11 is connected to terminal 23 which can be viewed as the output terminal of the circuit of Fig. 1, or as the input terminal to a using apparatus, not shown. Terminal 24 would be the negative output terminal of the circuit as shown in Fig. 1. The circuit in Fig. 1 can be viewed as a self-contained circuit to which direct-current potential is applied at terminals 21 and 22 and direct-current potential is removed at terminals 23 and 24.

Resistors 25 and 26 are connected in series and are connected between base 15 of transistor 11 and lead 27 which interconnects negative terminals 22 and 24. A diode 28 has its cathode connected to base 18 of transistor 12 and its anode connected to a resistor 29 which is in turn connected to lead 27. Diode 28 is a Zener diode, the operation of which will be more fully explained hereinafter.

The circuit as illustrated in Fig. 1 is interconnected in such a manner that transistor 11 is forward biased by connecting the emitter 13 to the positive terminal 21 to permit current to flow therethrough from the input to the output during the period of time that no transients occur during the output of the power supply to which terminals 21 and 22 are connected. Transistor 12 is connected in such a manner that it would appear to be normally forward biased, thereby permitting current to flow through it. However, transistor 12 is maintained in a non-conducting state during the period of time that no transients occur by the use of the diode 28. If, however, a transient does occur, the transistor 12 becomes immediately conducting and by its conduction causes transistor 11 to, in turn, become non-conducting. When transistor 11 becomes non-conducting, it removes the power from terminals 23 and 24 and thereby removes the transient from the output of the circuit as shown in Fig. 1.

Referring now more in detail to the operation of the circuit as illustrated in Fig. 1, reference is made to Fig. 5 which illustrates wave forms taken at various points in the circuit of Fig. 1. Wave form A is taken across terminals 21 and 22, wave form B is taken at point B which is across resistor 26, while wave form C is taken between terminals 23 and 24.

During normal operation, diode 28 is maintained in a back biased or reversed biased condition by the application of the negative potential from terminal 22 to the anode thereof. Diode 28 is chosen so that its Zener breakdown voltage is slightly greater than the normal expected variation of voltage appearing at terminals 21 and 22 which is in accordance with the desirable specifications of the using apparatus. Therefore, during the period of time that the voltage appearing at terminals 21 and 22 does not exceed the breakdown voltage of the Zener diode 28, it will remain back biased. By being back biased, this diode effectively opens circuits the base lead of transistor 12, thereby keeping transistor 12 in a non-conducting state by opening the emitter-base circuit thereof. While transistor 12 is in a non-conducting state, the emitter-base circuit of transistor 11 is forward biased, thus causing current to flow through transistor 11 and a voltage to appear at terminals 23 and 24 which is substantially the same as the voltage appearing at terminals 21 and 22 since there is very little loss through a saturated transistor.

Assuming that a transient appears at terminals 21 and 22, such as that as illustrated at 31 in Fig. 5, the following operation would occur. Initially, the voltage appearing at terminals 23 and 24 follows the rise of voltage caused by the transient 31. This is illustrated at 32 on curve C of Fig. 5. When the voltage at terminals 21 and 22 has reached the point shown at 32, the Zener diode 28 breaks down, that is, begins to conduct in a reverse direction. This, therefore, completes the emitter-base circuit of transistor 12 thereby causing transistor 12 to begin to conduct.

Transistor 12 is selected so that it has characteristics which cause it to almost instantaneously saturate. This, therefore, causes current to flow through the transistor 12 from emitter to collector, and through resistor 26 back to lead 27, and the negative terminal of the input source. This causes the voltage appearing across resistor 26, as shown at 33 and curve B of Fig. 5, to suddenly increase in value. The sudden increase across resistor 26 is applied to the base 15 of transistor 11. This back biases the emitter-base circuit to transistor 11, causing transistor 11 to become non-conducting. When transistor 11 becomes non-conducting, the voltage appearing across the D.C. output terminals 23 and 24 suddenly drops to zero as indicated at 34 on curve C of Fig. 5. This condition maintains during the period of time that the transient 31 is present across terminals 21 and 22. When the transient 31 drops in magnitude below the Zener breakdown voltage of the diode 28, it once again becomes back biased, therefore causing transistor 12 to suddenly become non-conducting. When this occurs the voltage at the D.C. output terminals 23 and 24 once again returns to its normal value as shown at 35 in Fig. 5.

If a transient of long duration, such as shown at 36 on Fig. 5, suddenly appears at input terminals 21 and 22 of the circuit of Fig. 1, the voltage appearing across resistor 26 rises also as shown at 37 on Fig. 5. This rise, as before, is the result of the conduction of current through transistor 12 as a result of the Zener breakdown of diode 28. This, in turn, causes transistor 11 to become non-conducting by back biasing its emitter-base circuit, thereby causing the voltage appearing at the D.C. output terminals 23 and 24 to drop to zero as illustrated at 38 on Fig. 5. Once the transient 36 disappears allowing the voltage appearing at the terminals 21 and 22 to return to its normal state, the voltage appearing at the terminals 23 and 24 once again returns to its normal value as shown at 39. This occurs since transistor 11 is once again allowed to become conducting when transistor 12 is caused to become non-conducting by the back biasing of diode 28. It is, therefore, seen that upon the application of a transient to the D.C. input terminals 21 and 22 of the circuit of Fig. 1 which is greater in amplitude than the Zener breakdown voltage of diode 28, transistor 12 becomes conducting and saturates almost instantaneously, thus causing transistor 11 to become non-conducting thereby removing the transient from the D.C. output terminals and thereby from any using apparatus which may be connected thereto.

It is well known in the prior art of that a leakage current flows through the collector of a transistor when the emitter-base circuit is open. This current is normally referred to as the $I_{CO}$ of the transistor. In the circuit as illustrated in Fig. 1 the $I_{CO}$ of the transistor 12 is increased by the Beta of the transistor. While this is not a problem in most applications for the circuit of Fig. 1, the $I_{CO}$ flowing through the collector of transistor 12 and resistor 26 may in some instances be large enough to reduce the base drive for the transistor 11 sufficiently to be undesirable. In such instances, the circuit of Fig. 2 may be used.

Figure 2:
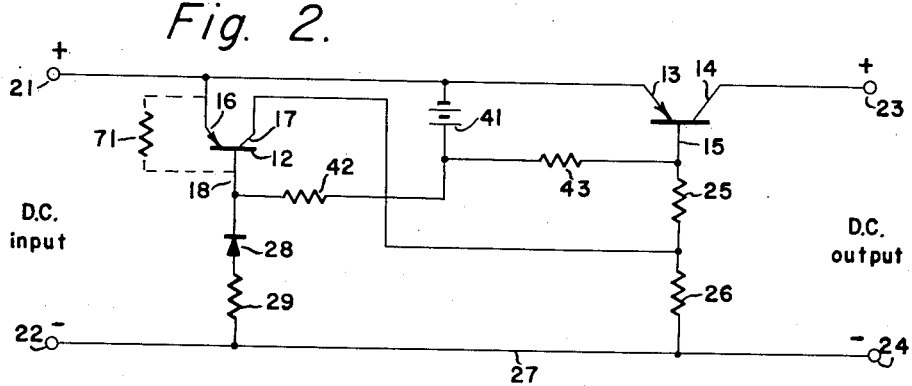
Fig. 2 is a schematic diagram illustrating an alternative embodiment of the transistor circuit in accordance with the present invention.

The circuit shown in Fig. 2 is identical to that illustrated in Fig. 1 as indicated by the use of identical symbols for the same parts with the exception of the addition of the source of bias supply which is shown as a battery 41 having connected to the positive terminal thereof the resistors 42 and 43. The resistor 43 is connected from the positive terminal of the battery 41 to the base 15 of transistor 11, while the resistor 42 is connected from the positive terminal of battery 41 to the base 18 of transistor 12. The negative terminal of the battery 41 is connected to the positive terminal 21 of the D.C. input terminals. The battery 41 and the resistor 42 supply the $I_{co}$ for the transistor 12 thereby reducing the amount of current flowing through the resistor 26 in the base circuit of the transistor 11. This, therefore, minimizes the drain of base current drive from the transistor 11. The battery 41 and resistor 42 also supply any leakage current which may be demanded by the diode 28.

Alternatively, the $I_{co}$ of the transistor 12 may be supplied by shunting a resistor between the emitter and base of the transistor 12 as illustrated at 71 by the dashed lines in Fig. 2. While this configuration is not as efficient as that above described, it has been found to work quite effectively in some cases.

Assuming that a transient is applied to D.C. input terminals 21 and 22, such that transistor 11 becomes non-conducting and transistor 12 conducting, the resistor 43 in conjunction with the bias supply 41 operates in substantially the same manner as does the resistor 42. That is, the $I_{co}$ of transistor 11 is supplied by the resistor 43 and the bias supply 41 or, in the alternative, it may be viewed as assuring that transistor 11 will be cut off during the period of time that the transient is applied to the input terminals 21 and 22.

Figure 3:
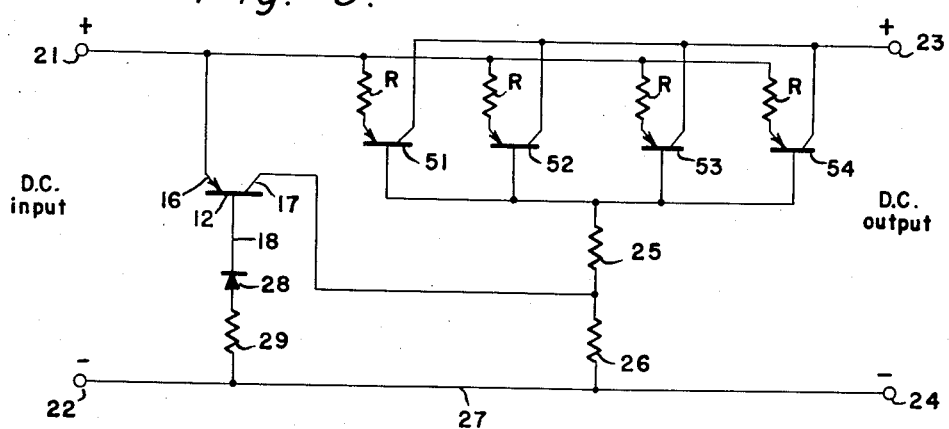
Fig. 3 is a schematic circuit diagram illustrating the utilization of a circuit in accordance with the present invention in a high-current handling type device.

Referring now more particularly to Fig. 3, there is illustrated a circuit in accordance with the present invention which is adapted to supply large amounts of current to a using apparatus. Again, the parts which are identical to the circuits as illustrated in Figs. 1 and 2 are indicated by using the identical reference numeral. In addition to the same or similar parts as previously described, transistor 11 has been replaced by four transistors 51 through 54 inclusive. Each of the transistors 51 through 54 includes an emitter, a collector and a base. Each of the collectors is interconnected in parallel and is connected to the output terminal 23. Each of the bases is connected in parallel and returned through the resistors 25 and 26 to the negative D.C. output terminal 24. A small resistor R is connected in the emitter circuit of each of the transistors 51 through 54 in order to cause the current to divide equally among each of the four transistors. The emitters are then interconnected and returned to the positive D.C. input terminal. The circuit otherwise operates identically to that as described in conjunction with Fig. 1 above. In this manner, additional current may be handled by the circuit as shown in Fig. 3 as compared to that of the circuits as shown in Figs. 1 and 2.

In some applications of a circuit for protecting a using apparatus from undesirable transients it sometimes becomes desirable to accurately control the point at which the Zener diode breaks down, thereby causing the transistor 11 as illustrated in each of the circuits above described to conduct. In order to accomplish this, a circuit as illustrated in Fig. 4 may be utilized. As is shown in Fig. 4, a resistor 61 and a potentiometer 62 are connected in series, the resistor 61 being connected to the positive input terminal 21, while the wiper arm 63 of the potentiometer 62 is connected to the anode of the diode 28. In this manner, the wiper arm 63 of the potentiometer 62 may be adjusted in such a manner as to critically set the point at which the Zener diode 28 will break down in response to the application of the transient to the terminals 21 and 22. This merely sets the point at which the diode will fire when viewing the leading edge of the transient curve. By adjusting the wiper arm 63, the diode may be caused to fire either lower or higher upon the leading edge of the transient curve. In this way more minute adjustment may be obtained.

There has thus been described a transistor circuit which may be utilized for effectively eliminating undesirable transients which may appear at the output of a direct-current power supply and which may, if not eliminated, damage equipment which is connected to the output of the power supply. The circuit as herein disclosed operates automatically in response to the application of the transient and operates almost instantaneously, being limited in the speed of operation only by the frequency response of the semiconductor elements which are employed therein.

What is claimed is:

1. A circuit for eliminating transients occurring in direct-current power supply having first and second terminals, said circuit including the combination of first and second transistor means, means for interconnecting said first transistor means to said terminals for biasing said first transistor means to pass current during the absence of transients, means for interconnecting said second transistor means to said terminals for causing it to conduct only during the presence of transients at said terminals, and means interconnecting said first and second transistor means to cause said first transistor means to become substantially non-conducting in response to said second transistor means becoming conductive.

2. A circuit for eliminating transients occurring in a direct-current power supply having first and second terminals, said circuit including the combination of a first transistor having an emitter, a collector and a base, a second transistor having an emitter, a collector and a base, means interconnecting the emitter and base of said first transistor with said terminals to cause said first transistor to conduct during the absence of transients at said terminals, means interconnecting the emitter and base of said second transistor with said terminals to cause said second transistor to conduct only during the presence of transients at said terminals, and means interconnecting the collector of said second transistor with the base of said first transistor to cause said first transistor to become non-conducting in response to said second transistor becoming conductive.

3. A circuit for eliminating transients occurring in a direct-current power supply having first and second terminals, said circuit including the combination of a first transistor having an emitter, a collector, and a base, a second transistor having an emitter, a collector, and a base, each of said emitters being interconnected and returned to the first terminal of said power supply, means connecting the base of said first transistor to the second terminal of said power supply whereby said first transistor is biased to pass current during the period of time when no transients appear at the terminals of said power supply, means connecting the base of said second transistor to the second terminal of said power supply, said last named means being adapted to cause said second transistor to remain non-conducting during the period of time when no transients are present upon the terminals of said power supply and to cause said second transistor to conduct during the presence of transients at the terminals of said power supply, and the collector of said second transistor being connected to the base of said first transistor, whereby said first transistor becomes non-conducting during the period of time said second transistor is conducting.

4. A circuit for eliminating transients occurring in a direct-current power supply having first and second terminals thereon, said circuit including the combination of a first transistor having an emitter, a collector, and a base, a second transistor having an emitter, a collector, and a base, each of said emitters being interconnected and returned to the first terminal of said power supply, first and second resistive impedance elements connected in series between the base of said first transistor and the second terminal of said power supply, means connecting the base of said second transistor to the second terminal of said power supply, said last named means being adapted to cause said second transistor to remain non-conducting during the period of time when no transients are present upon the output terminals of said power supply and to cause said second transistor to conduct during the presence of transients at the output terminals of said power supply, the collector of said second transistor being connected to a point between said first and second impedance elements, whereby said first transistor becomes non-conducting during the period of time said second transistor is conducting.

5. A circuit for eliminating transients occurring in a direct-current power supply having first and second terminals, said circuit including the combination of a first transistor having an emitter, a collector, and a base, a second transistor having an emitter, a collector, and a base, each of said emitters being interconnected and returned to the first terminal of said power supply, first and second resistors connected in series between the base of said first transistor and the second terminal of said power supply, whereby said first transistor is biased to pass current, a diode having Zener breakdown characteristics connected to the base of said second transistor, means connecting said diode to the second terminal of said power supply, said diode being poled to cause said second transistor to remain non-conducting during the period of time when no transients are present upon the terminals of said power supply and to cause said second transistor to conduct during the presence of transients at the terminals of said power supply, the collector of said second transistor being connected to a point between said first and second resistors, whereby said first transistor becomes non-conducting during the period of time said second transistor is conducting.

6. A circuit for eliminating transients occuring in a direct-current power supply, having first and second terminals, said circuit including the combination of a first transistor having an emitter, a collector, and a base, a second transistor having an emitter, a collector and a base, means interconnecting said first transistor with said terminals to cause said first transistor to conduct during the absence of transients, means interconnecting said second transistor with said terminals whereby said second transistor conducts only during the presence of transients at said terminals, means connecting the collector of said second transistor to the base of said first transistor to cause said first transistor to become non-conducting in response to said second transistor becoming conductive, and means connected to the base of said second transistor for supplying the collector leakage current thereof during the time said second transistor is non-conducting.

7. A circuit for eliminating transients occurring in a direct-current power supply having first and second terminals, said circuit including the combination of a first transistor having an emitter, a collector, and a base, a second transistor having an emitter, a collector, and a base, means interconnecting said first transistor with said terminals to cause said first transistor to conduct during the absence of transients, means interconnecting said second transistor with said terminals whereby said second transistor conducts only during the presence of transients at said terminals, means connecting the collector of said second transistor to the base of said first transistor to cause said first transistor to become non-conducting in response to said second transistor becoming conductive, a source of current, and means connected between said source and the bases of said first and second transistors to supply the collector leakage current of said first and second transistors during the time they are non-conducting.

8. A circuit for eliminating transients occurring in a direct-current power supply having first and second terminals, said circuit including the combination of a first transistor having an emitter, a collector, and a base, a second transistor having an emitter, a collector, and a base, each of said emitters being interconnected and returned to the first terminal of said power supply, first and second resistors connected in series between the base of said first transistor and the second terminal of said power supply, whereby said first transistor is biased to pass current, a diode having Zener breakdown characteristics connected to the base of said second transistor, means connecting said diode to the second terminal of said power supply, said diode being poled to cause said second transistor to remain non-conducting during the period of time when no transients are present upon the terminals of said power supply and to cause said second transistor to conduct during the presence of transients at the terminals of said power supply, and means connected between said first terminal and said diode for setting the potential at which said diode breaks down, the collector of said second transistor being connected to a point between said first and second resistors, whereby said first transistor becomes non-conducting during the period of time said second transistor is conducting.

9. A circuit for eliminating transients occurring in a direct-current power supply having first and second terminals, said circuit including the combination of a first transistor having an emitter, a collector, and a base, a second transistor having an emitter, a collector, and a base, each of said emitters being interconnected and returned to the first terminal of said power supply, first and second resistors connected in series between the base of said first transistor and the second terminal of said power supply, whereby said first transistor is biased to pass current, a diode having Zener breakdown characteristics connected to the base of said second transistor, means connecting said diode to the second terminal of said power supply, said diode being poled to cause said second transistor to remain non-conducting during the period of time when no transients are present upon the terminals of said power supply and to cause said second transistor to conduct during the presence of transients at the terminals of said power supply, a potentiometer connected between said first terminal and said diode for adjusting the potential at which said diode breaks down in response to the application of a transient thereto, the collector of said second transistor being connected to a point between said first and second resistor, whereby said first transistor becomes non-conducting during the period of time said second transistor is conducting.

10. A circuit for eliminating transients occurring in a direct-current power supply having first and second terminals, said circuit including the combination of a first transistor having an emitter, a collector, and a base, a second transistor having an emitter, a collector, and a base, each of said emitters being interconnected and returned to the first terminal of said power supply, first and second resistors connected in series between the base of said first transistor and the second terminal of said power supply, whereby said first transistor is biased to pass current, a diode having Zener breakdown characteristics and a resistor connected in series and connected between the base of said second transistor and said second terminal of said power supply, said diode being poled to cause said second transistor to remain non-conducting during the period of time when no transients are present upon the terminals of said power supply and to cause said second transistor to conduct during the presence of transients at the terminals of said power supply, the collector of said second transistor being connected to a point between said first and second resistors, whereby said first transistor becomes non-conducting during the period of time said second transistor is conducting.

11. A circuit for eliminating transients occurring in a direct-current power supply, having first and and second terminals, said circuit including the combination of a first transistor having an emitter, a collector, and a base, a plurality of transistors each having an emitter, a collector, and a base, means interconnecting the emitters, collectors, and bases of said plurality of transistors respectively in parallel, means interconnecting said plurality of transistors with said terminals to cause each of said plurality of transistors to conduct during the absence of transients at said terminals, means interconnecting said first transistor with said terminals whereby said first transistor conducts only during the presence of transients at said terminals, and means connecting the collector of said first transistor to the parallel connected bases of said plurality of transistors to cause said plurality of transistors to become non-conducting in response to said first transistor becoming conductive.

12. A circuit for eliminating transients occurring in a direct-current power supply, having first and second terminals, said circuit including the combination of a first transistor having an emitter, a collector, and a base, a plurality of transistors each having an emitter, a collector, and a base, means interconnecting the emitters, collectors, and bases of said plurality of transistors respectively in parallel, means interconnecting said parallel-connected emitters of said plurality of transistors and the emitter of said first transistor with said first terminal of said power supply, resistive impedance means connected between said parallel connected bases of said plurality of transistors and said second terminal of said power supply to bias said plurality of transistors to pass current, a diode having Zener breakdown characteristics connected to the base of said first transistor, means connecting said diode to the second terminal of said power supply, said diode being poled to cause said first transistor to remain non-conducting during the absence of transients and to become conductive only during the presence of transients at the terminals of said power supply, and means including said resistive impedance means interconnecting the collector of said first transistor and the bases of said plurality of transistors, whereby said plurality of transistors becomes substantially non-conducting in response to said first transistor becoming conductive.

References Cited in the file of this patent

UNITED STATES PATENTS 2,832,900    Ford _____ Apr. 29, 1958